July 6, 1943. H. W. GUNBERG 2,323,592
TWO-SPEED SUPERCHARGER DRIVE CONTROL
Filed Feb. 24, 1940 5 Sheets-Sheet 1
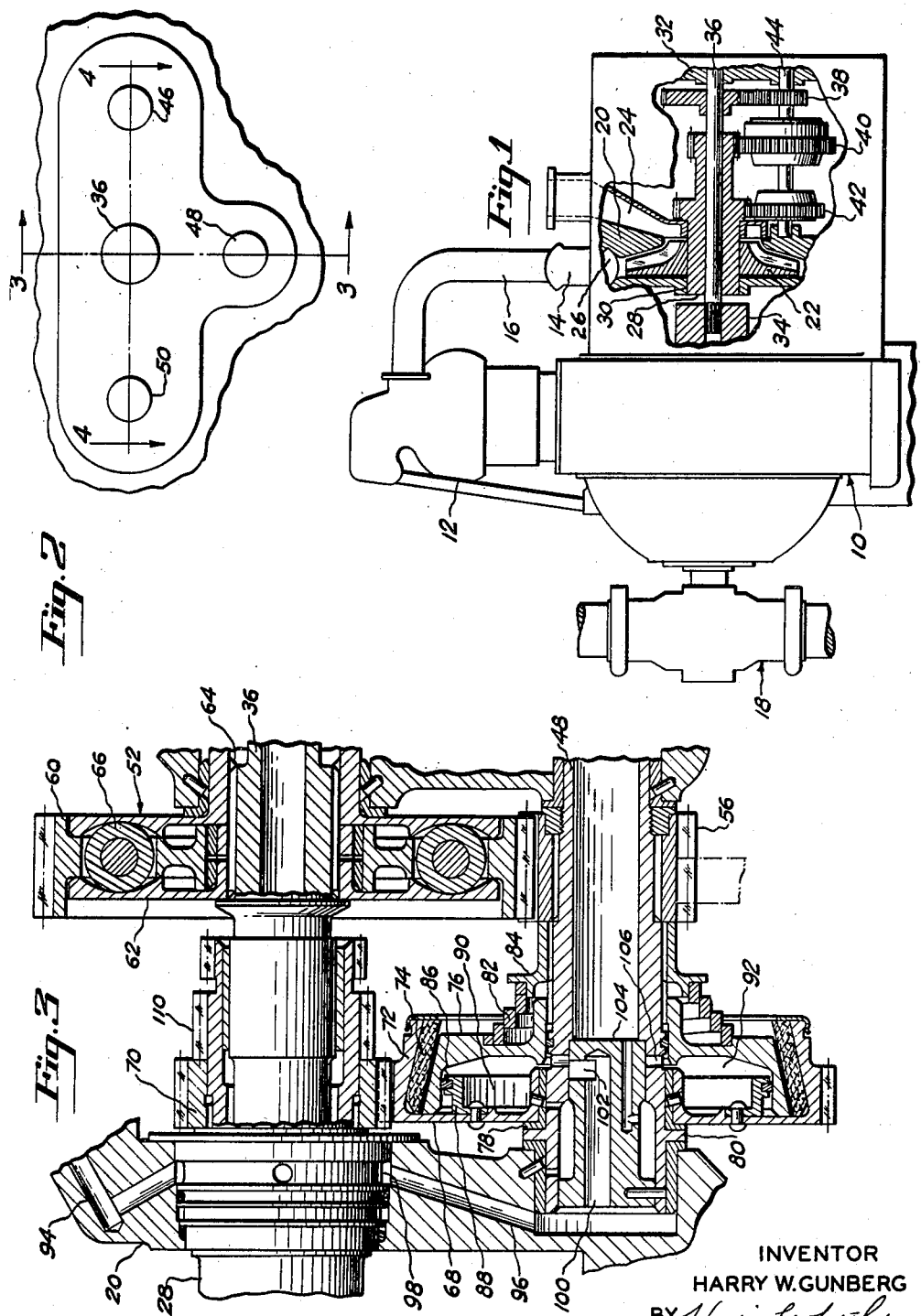
INVENTOR
HARRY W. GUNBERG
BY Harris G. Luther
ATTORNEY July 6, 1943. H. W. GUNBERG 2,323,592
TWO-SPEED SUPERCHARGER DRIVE CONTROL
Filed Feb. 24, 1940 5 Sheets-Sheet 2

INVENTOR
HARRY W. GUNBERG
BY Harris G. Luther
ATTORNEY

July 6, 1943.     H. W. GUNBERG     2,323,592
TWO-SPEED SUPERCHARGER DRIVE CONTROL
Filed Feb. 24, 1940     5 Sheets-Sheet 3

INVENTOR
HARRY W. GUNBERG
BY Harris G. Luther
ATTORNEY

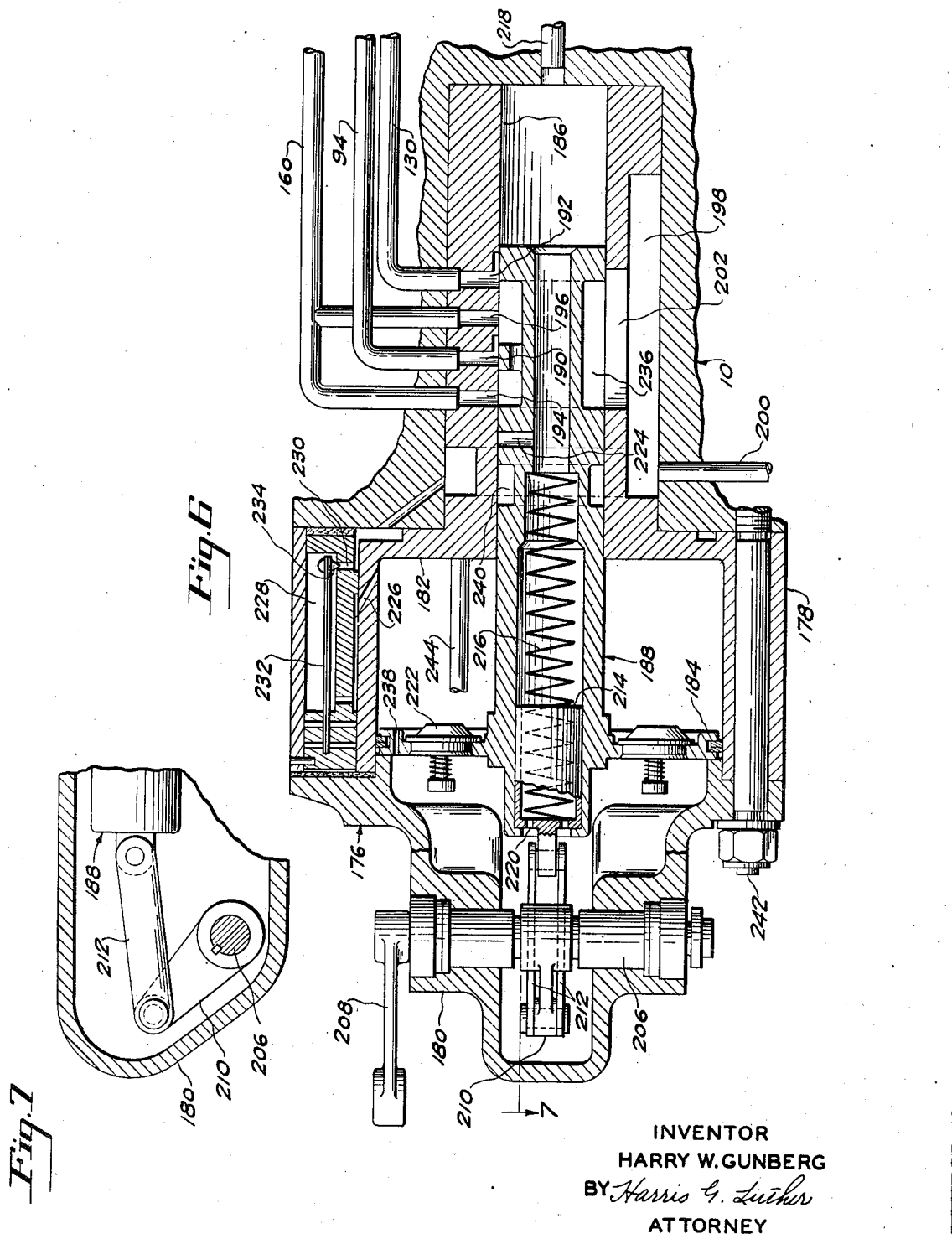

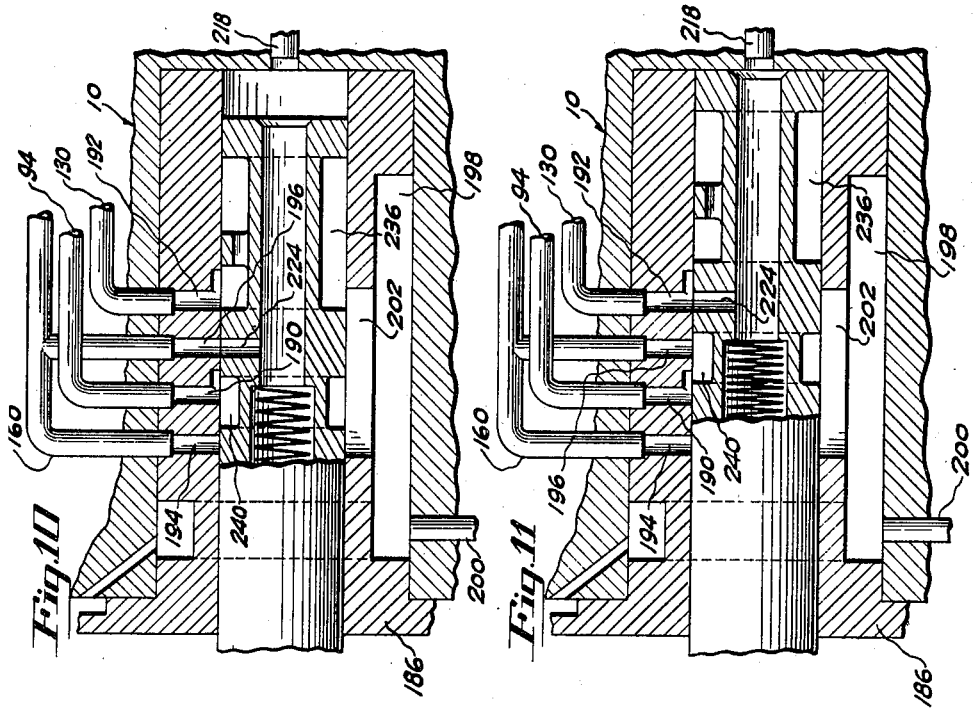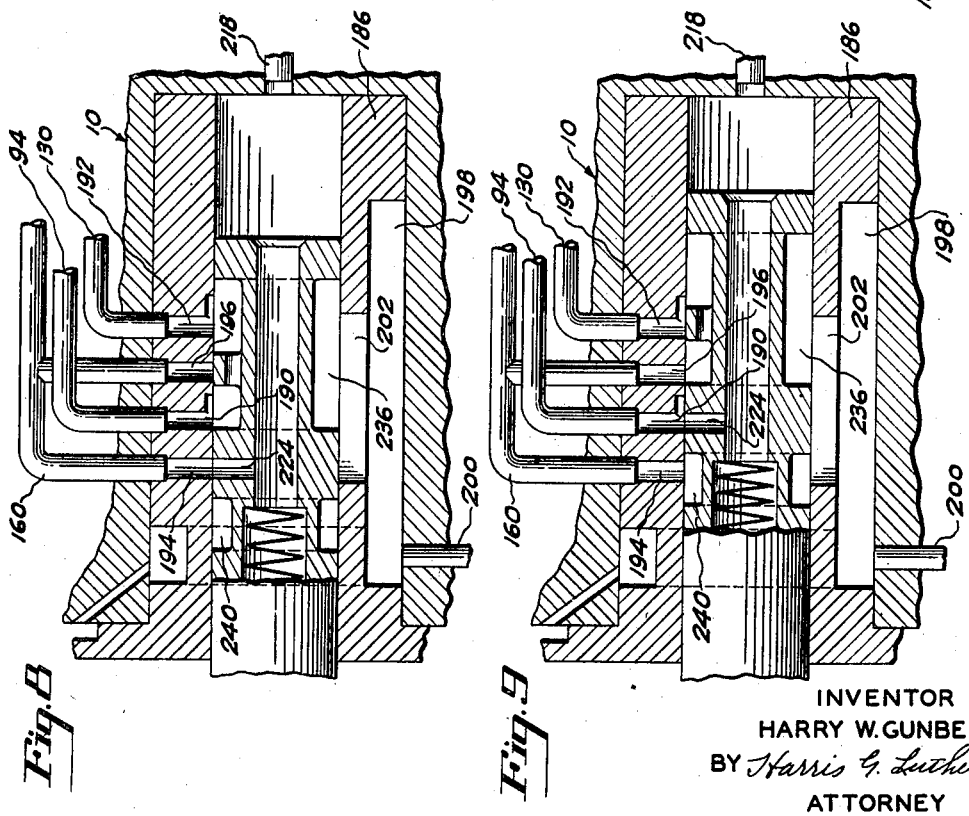

Patented July 6, 1943

2,323,592

UNITED STATES PATENT OFFICE 2,323,592

TWO-SPEED SUPERCHARGER DRIVE CONTROL

Harry W. Gunberg, West Hartford, Conn., assignor to United Aircraft Corporation, East Hartford, Conn., a corporation of Delaware Application February 24, 1940, Serial No. 320,710

11 Claims. (Cl. 74—189.5)

This invention relates to improvements in change speed gear drives or power transmissions and has particular reference to a change speed gear drive or transmission for a rotating body such as a fan or supercharger impeller although the principles of the invention are in no way limited to this particular application.

An object resides in the provision of means for automatically synchronizing the speed of the driving and driven elements of the gear train of a change speed drive gear to which the drive is shifted.

An additional object resides in the provision, in combination with a change speed gear including a hydraulic synchronizer for synchronizing the speed of the driving and driven elements of the various gear trains, of a valve for transferring the drive from one gear train to another and simultaneously actuating the synchronizing mechanism so that the drive may be transferred without excessive strain on any part of the change speed gear.

Another object of the invention is to provide a timing valve and control so that a single fluid coupling may be used for synchronizing the impeller with the clutch of any one of several gear trains.

Other objects and advantages will be more particularly pointed out hereinafter or will become apparent as the description proceeds.

In the accompanying drawings, in which like reference numerals are used to indicate similar parts throughout, there is illustrated in two slightly different forms a suitable mechanical embodiment for the purpose of disclosing the invention. The drawings, however, are for the purpose of illustration only and are not to be taken as limiting the invention since it will be apparent to those skilled in the art that various changes in the illustrated constructions may be resorted to without in any way exceeding the scope of the invention.

In the drawings,

Fig. 1 is a schematic view of a change speed gear of the character indicated applied to the supercharger impeller drive of an internal combustion engine.

Fig. 2 is a rear elevational of a modified form of supercharger drive.

Fig. 3 is a sectional view of an enlarged scale on the line 3—3 of Fig. 2.

Fig. 6 is a longitudinal sectional view of a control valve for the change speed gear unit shown in Figs. 3, 4 and 5.

Fig. 7 is a sectional view of a fragmentary portion of the valve unit shown in Fig. 6 taken on the line 7—7 of Fig. 6.

Figure 4:
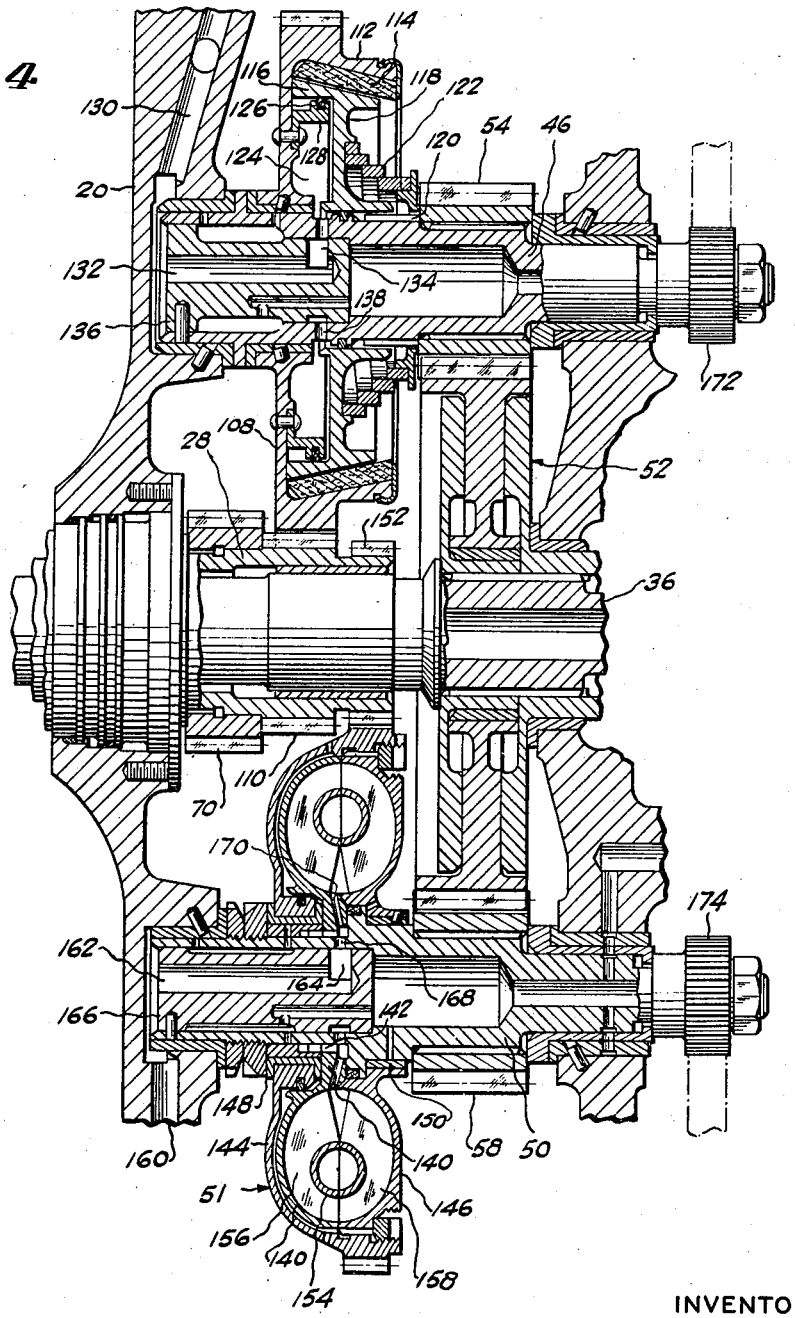
Fig. 4 is a sectional view on an enlarged scale on the line 4—4 of Fig. 2.

Figs. 8, 9, 10, and 11 are diagrammatic sketches showing the hydraulic connections for the various operative positions of the valve shown in Fig. 6.

Referring to the drawings in detail and particularly to Fig. 1 the numeral 10 generally indicates the crankcase of an internal combustion engine, such as a radial type supercharged engine conventionally employed for the propulsion of aircraft. It is to be understood, however, that the invention is in no way limited to any particular type of engine or to the illustrated application to an engine supercharger drive.

In the engine illustrated the crankcase 10 may carry a plurality of cylinders, one of which is indicated at 12, connected to the supercharger blower section 14 by respective intake ducts, as indicated at 16, and may drive an aeronautical propeller fragmentarily illustrated and generally indicated at 18.

The supercharger may include a casing 20 within which is mounted a rotatable impeller 22 which receives air from the air intake 24 and directs it at increased pressure to the diffuser 26. The impeller 22 may be mounted on an impeller drive sleeve 28 rotatably supported in the casing 20 by suitable means such as the bearing 30 and the shaft 36 which is supported by the bearing 32 and crankshaft 34. The impeller may be driven from the engine crankshaft 34 by means of a tail shaft 36 and a change speed gear drive including a plurality of gear trains, as indicated at 38, 40 and 42. The gear train 38 may constitute a permanent driving connection between the tail shaft 36 and the lay shaft 44 and the gear trains 40 and 42 may constitute different speed ratio drives between the lay shaft and the impeller drive sleeve 28.

Figure 5:
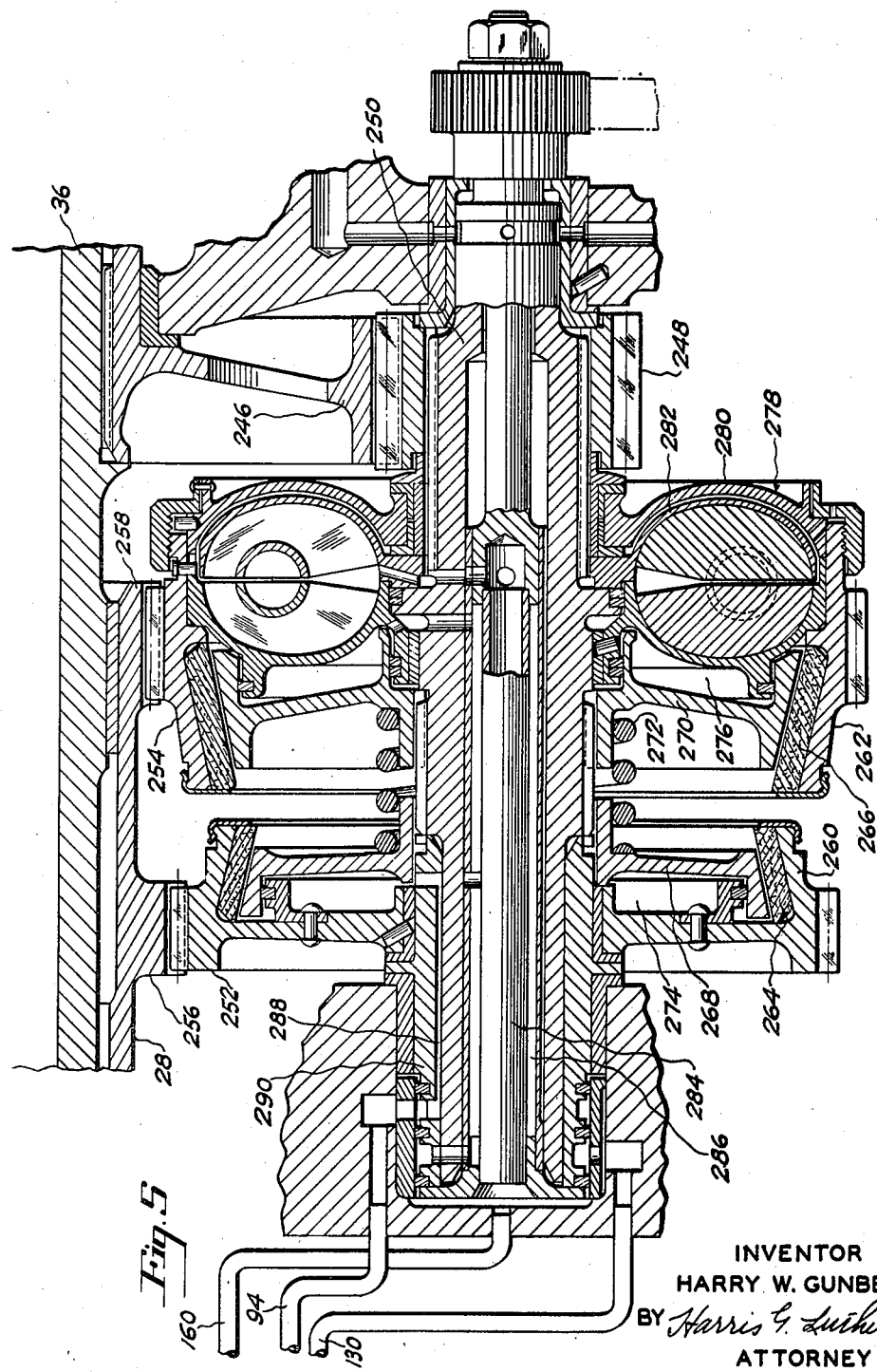
Fig. 5 is a sectional view on an enlarged scale of the change speed gear drive of Fig. 1.

The various units of the change speed gear drive such as the various gear trains and their connecting clutches and the synchronizing device may all be mounted on the same shaft, as schematically indicated in Fig. 1 and shown in detail in Fig. 5, or these various units may be mounted on separate shafts, as shown in Figs. 2, 3 and 4. As an example of the latter arrangement the tail shaft 36 and gear train 38 may occupy the central position in the arrangement shown in Fig. 2 and the drive gear on the tail shaft may mesh with separate drive gears on three different lay shafts, as indicated at 46, 48 and 50. As shown in Figs. 3 and 4, the low speed gear train 42 may be disposed between the centrally disposed lay shaft 48 and the impeller drive sleeve surrounding the tail shaft 36, the high speed gear train 40 may be disposed between the lay shaft 46 and the impeller drive sleeve while the synchronizing device, generally indicated at 51, may be disposed between the lay shaft 50 and the impeller drive sleeve.

Referring now particularly to Figs. 3 and 4, the tail shaft 36 carries a drive gear, generally indicated at 52 which meshes with driven gears 54, 56 and 58 carried by the lay shafts 46, 48 and 50, respectively, so that all three of the lay shafts rotate with the tail shaft when the engine is operating. The gear 52 may be formed in two parts one of which, as indicated at 60, carries the gear teeth and the other, as indicated at 62, is secured to the shaft 36 by suitable means such as the spline 64. The two parts 60 and 62 are drivingly connected by means of a plurality of spring packs 66 to provide a spring cushioned drive between the tail shaft 36 and the lay shaft gears 54, 56 and 58 in a manner well known to the art.

A spur gear 68 is carried by the lay shaft 48 for free rotation relative thereto and has peripheral teeth which mesh with the peripheral teeth of a low speed drive gear 70 formed integrally with or rigidly secured on the impeller drive sleeve 28. The gear 68 is provided with an annular flange 72 which may carry internally thereof a clutch facing 74 to constitute one element of a clutch by means of which the gear 68 may be associated with the shaft 48 against rotation relative thereto. The other portion of this clutch is constituted by a member 76 having a slidable splined connection with the shaft 48 and a tapered flange underlying the clutch facing 74 and operative to frictionally engage the clutch facing upon movement of the member 76 axially of the shaft 48 in a direction away from the associated gear 68, the gear 68 being restrained from axial movement along the shaft by suitable means such as the bearing bushing 78 cooperating with an annular shoulder 80 formed on the shaft 48. A compression spring 82 bearing at one end against the clutch element 76 and at its other end against the annular abutment 84 resiliently urges the member 76 towards the gear 68 to disengage the clutch and permit the gear to rotate freely on the shaft 48. Within the space between the gear 68 and the clutch element 76 a fluid seal 86, carried by a flange member 88 rigidly secured to the gear 68, cooperates with a cylindrical surface 90 provided within the flange of the member 76 to provide an annular fluid chamber 92 surrounding the shaft 48 within the members 68 and 76 to which fluid under pressure is directed, forcing the members 76 and 68 apart to engage the clutch and provide a drive between the shaft 48 and the impeller drive sleeve 28. The chamber 92 may be supplied with fluid under pressure through the channels 94 and 96, the annular groove 98 leading around the impeller drive sleeve 28, and the channels 100 and 102 in the drilled plug 104 inserted in the end portion of the hollow shaft 48, and the port 106 leading from the channel 102 through the hollow shaft to the annular chamber 92. The remaining channels and ports shown in the plug 104 and the shaft 48 are for the purpose of supplying lubricating oil to the end bearings of the shaft.

The lay shaft 46 carries a clutch and gear arrangement similar to that carried by the shaft 48 and described above. As shown in Fig. 4, the gear 108, freely rotatable on the shaft 46 but restrained from axial movement thereon, has peripheral teeth which mesh with the teeth of the high speed drive gear 110 integral with the impeller drive sleeve 28. This gear has an integral flange 112 which carries a clutch facing 114 engageable with the tapered flange 116 of a clutch element 118 rotatable with the shaft 46 by reason of the spline connection 120, and slidable along the shaft in one direction by the spring 122 and in the other direction by fluid pressure in the annular chamber 124 sealed by the packing 126 carried by the annular flange member 128. Fluid under pressure is supplied to the chamber 124 through a channel 130 in the casing 20 and channels 132 and 134 in the plug 136 and ports 138 in the hollow shaft 46 leading from the channels 132 and 134 to the annular space 124.

The hydraulic coupling unit or synchronizing accelerator, generally indicated at 51, is carried by the lay shaft 50 and has one portion 140 drivingly connected with this shaft through the spline connection 142 and a second portion including the elements 144 and 146 rotatably mounted upon the shaft by the bearing bushings 148 and 150, the portion 144 being provided with peripheral gear teeth which mesh with the teeth of a gear 152 formed on the impeller drive sleeve 28 and having a diameter less than the diameter of either of the gears 70 or 110. The coupling 51 may be of a general character well known to the prior art, and commonly known as the Föttinger type of hydraulic coupling. In general, the elements 140 and 146 when associated in the relation illustrated constitute a toroidal chamber one-half of which is connected to the shaft 50 and the other half of which is drivingly associated with the gear 152. Within the toroidal chamber there is an annular core 154 of substantially circular section split into two annular parts one of which is carried by the member 140 and the other by the member 146. A plurality of radial vanes 156 are disposed in the space between the member 140 and the associated portion of the core 154 and a plurality of similar vanes 158 are disposed in the space between the element 146 and the associated portion of the core 154. When there is no fluid in the toroidal chamber, element 140 may rotate freely relative to the associated elements 144 and 146, in which case there will be no drive between the shaft 50 and the gear 152. However, as fluid is admitted to the toroidal chamber the element 140 rotating with the shaft 50 will exert centrifugal force on the fluid causing it to circulate about the core 154. This movement of the fluid exerts a force on the portion of the coupling including the members 144 and 146 and causes this portion to rotate with the element 140, the fluid connection between the two portions of the coupling being uniform and flexible so that no sudden impulses are imparted to the driven portion but its speed is gradually increased to near the speed of the driving portion. For the purposes of this disclosure it may be said that such a coupling tends to operate with an extremely small slip, that is, small speed difference between the driving and driven elements, after the initial starting effort on the driven portion has been accomplished. Hydraulic fluid is supplied to the toroidal chamber through the conduit 160, the drilled passages 162 and 164 in the plug 166 inserted in the end of the hollow shaft 50 and the ports 168 leading through the hollow shaft to the passages 170 extending through the inner portion of the coupling element 140 to the annular chamber.

The ends of the shafts 46 and 50 may be provided with driving gears 172 and 174 splined thereto if desired, to which other engine accessories such as magnetos or generators may be operatively connected.

The flow of hydraulic fluid to the gear clutches and the accelerator 51 is controlled by a manually operable valve 176 and particularly illustrated in Fig. 6. This valve has a two part casing one part of which comprises the double cylinder 178 and the other part the detachable cylinder head 180. The portion 178 includes a hydraulic cylinder 182, in which the piston 184 is reciprocable, and an integral cylindrical ported valve casing 186, concentric with the cylinder 182, in which the valve plunger, generally indicated at 188, is reciprocable. When the valve 176 is operatively associated with an engine the valve casing 186 is inserted in a suitable aperture provided in some portion of the engine crankcase 10. The fluid conduit 94 for the low speed clutch leads through the engine crankcase to a port 190 in the valve cylinder 186. Similarly the conduit 130, connected with the high speed clutch, leads to a port 192 in the valve cylinder, and the conduit 160, connected with the hydraulic accelerator or synchronizer 51, is provided with two branches leading to ports 194 and 196 in the valve cylinder 186. The valve cylinder also includes a drain channel 198, connected with a drain conduit 200, and connected with the interior of the valve cylinder by the elongated slot 202.

The cylinder head 180 carries a rotatable shaft 206 the ends of which project beyond the exterior of the cylinder head and to one projecting end of which is secured the manually actuatable valve operating lever 208. Within the cylinder head the shaft 206 is provided with a radial arm 210 connected by suitable means, such as the link 212, with a movable abutment 214 slidable in the hollow valve plunger 188 and resiliently urged towards the end of the adjacent end of the plunger 188 by the coiled compression spring 216. The hollow valve plunger 188 is formed integrally with or rigidly secured to the piston 184 and may be divided into a number of separable parts if desired, for convenience in manufacture and assembly. Fluid under pressure is fed into the valve chamber through the conduit 218, and flows through the hollow valve member 188 and out through the ports 220 in the member 214 into the cylinder 182 where it may flow through the flap valves 222 to fill up the cylinder on both sides of the piston 184. Some of the fluid in the cylinder 182 may flow through the aperture 226 into the chamber 228 and through the conduit 230 controlled by the thermostat 232 and valve 234 to the drain channel 198, the purpose of this lead being to permit replacement of low temperature fluid in the cylinder 182 by warm fluid from the engine lubricating system. The thermostat 232 will close the valve 234 and cut off the flow of oil from the cylinder 182 to drain when the fluid in the cylinder is at the proper temperature.

The operation of the device is substantially as follows:

Assuming the valve member 188 and piston 184 to be in the left-hand position, as shown in Fig. 6, the valve will be in its neutral position with the pressure port 224 cut off and the lines 94, 130 and 160 connected with the drain channel 198 and drain line 200, through the slot 202 and groove 236 in the plunger 188, as is particularly illustrated in Fig. 6. Under these conditions both clutches and the hydraulic synchronizer will be free of oil and there will be no driving connection between the tail shaft 36 and the supercharger impeller. If it is now desired to place the impeller in operation the lever 208 will be manually actuated to the low speed drive position. Actuation of the lever 208 will rotate the shaft 206 and swing the arm 210 to move the link 212 in a direction to force the abutment 214 to the right compressing the spring 216. The piston 184, however, will not immediately follow the movements of the abutment 214 because of the fluid caught between the piston and the right hand end of the cylinder 182. However, the force of the spring 216 will urge the piston to the right, as viewed in Fig. 6, and the fluid in the space to the right of the piston will flow slowly through the bleed opening 238 in the piston, permitting the piston and the valve member 188 to move slowly to the right. As the valve plunger moves to the right the pressure port 224 will first come into alignment with the port 194, leading to the hydraulic synchronizer or accelerator through the conduit 160. Fluid under pressure will then flow from the valve to the accelerator and, by proper adjustment of the time interval of fluid application, render the accelerator operative only long enough or efficiently enough to absorb the work required to gently start the impeller and without sudden impulse bring its speed up substantially equal to or slightly above the speed at which it is driven by the low speed drive, this position of the valve being diagrammatically shown in Fig. 8. As the movement of the piston and valve member to the right continues the port 224 will move out of register with the port 194, thus cutting off the supply of oil to the accelerator, and will move into alignment with the port 190 leading to the low speed clutch conduit 94 to engage this clutch and put the low speed drive into operation. At the same time the annular groove 240 will move over the port 194 and connect this port with the drain channel, as is particularly shown in Fig. 9, the high speed drive conduit 130 being connected with the drain channel 200 through the annular groove 236. The movement of the piston and valve member to the right will be limited by the position of the abutment 214 as controlled by the position to which the shaft 206 is brought by the manual control and this limiting position will be such that the pressure port 224 will remain in registry with the port 190 to continue the supply of fluid under pressure to the low speed clutch as long as operation of the low speed drive is desired.

When it is desired to shift from the low speed to the high speed drive the manual control 208 is again actuated to bring the abutment 214 to the high speed drive position, again compressing the spring 216 to exert a resilient force on the valve member 188 and piston 184. As the fluid to the right of the piston again flows out through the bleed opening 238, movement of the valve member to the right will be resumed to first bring the groove 240 into register with the port 190 to drain the low speed clutch and release the low speed drive. Immediately after the low speed drive has been connected with drain the pressure port comes into registry with the fixed port 196 to again apply fluid to the hydraulic synchronizer or accelerator, the position of full registry being diagrammatically shown in Fig. 10. This application of fluid to the accelerator 51 will be of sufficient duration to absorb the work required to increase the speed of the impeller without sudden impulse, this time to a speed equal to or somewhat above the speed at which the impeller will be driven by the high speed drive. As shown in Fig. 4, the gear 152 is somewhat smaller than the high speed drive gear 110 in order to provide a gear ratio between the impeller and the accelerator somewhat greater than the ratio of the high speed drive to compensate for the slip of the hydraulic coupling 51 and render this coupling capable of bringing the impeller up to the full speed of the high speed drive. Continued movement of the valve member 188 to the right under the influence of the compressed spring 216 will then move the pressure port 224 out of register with the port 196 and into registry with the port 192 leading to the conduit 130 to apply fluid pressure to the high speed drive clutch. As the port 224 moves into registry with the port 192 the groove 240 moves into position to cover the port 196 to connect the conduit 160 with the drain line, in addition to the conduit 94 which has already been connected with drain, as explained above, to free the low speed drive and the accelerator and limit the drive to the high ratio gear train, the position of the valve for the high speed drive being particularly illustrated in Fig. 11. The valve may be left in the position shown in Fig. 11 as long as the high speed drive is desired.

The drive may be shifted from the high speed to the low speed drive by a reverse movement of the manual control moving the valve member 188 to the left. When such a movement is imparted to the valve member the flap valves 222 will permit rapid flow of fluid from the left hand to the right hand side of the piston 184 so that the drive is transferred almost immediately from the high speed to the low speed gear train, the action of the synchronizer being substantially omitted since the air resistance on the impeller will quickly bring the impeller down to the low gear ratio speed and the action of the synchronizer is not needed. In the same manner the valve may be returned to the neutral position illustrated in Fig. 6.

It is thus apparent that a change speed transmission has been provided which is operative under manual control to automatically shift the drive from one gear ratio to another and to match the speeds of the driving and driven elements as the drive is shifted from a lower to a higher ratio connection.

The automatic operation of the control valve and the timing of the synchronizing action by the piston 181 and bleed port 238 is claimed in this application. The action of the clutches and coupling together with the fluid distribution plug and the mechanical structural arrangement of the parts is claimed in Hobbs Serial Number 313,231.

The cylinder head 180 may be secured to the cylinder 178 and the member 178 may be secured in place on the crankcase 10 by suitable means, such as the through bolts 242, and the piston 184 and valve member 188 may be restrained against rotation in the member 178 by suitable means, such as the guide rods, one of which is indicated at 244.

Fig. 5 shows an arrangement in which the two gear drives and the synchronizing clutch are all mounted on the same shaft. In this arrangement a gear 246 on the tail shaft 36 drives a gear 248 splined on the lay shaft 250 so that the lay shaft is driven at all times at which the engine is in operation. Gear members 252 and 254, mounted on the shaft 250 for free rotation relative thereto, mesh with gear elements 256 and 258 respectively on the impeller drive sleeve 28, the elements 252 and 256 constituting a low speed drive while the elements 254 and 258 constitute a high speed drive. The elements 252 and 254 are provided with respective integral flanges 260 and 262 carrying clutch faces 264 and 266 with which the clutch faces of two flange members 268 and 270 may engage to provide driving connections between the shaft 250 and the sleeve 28, the members 268 and 270 being splined to the shaft 250 in such a manner that they are restrained from rotation relative to the shaft but are axially slidable along the shaft. The two clutch members 268 and 270 are disposed face to face and are urged apart by a compression spring 272 the resilient force of which tends to disengage both of the clutches and acts, whenever one of the clutches is engaged, to automatically disengage the alternative clutch. An annular fluid chamber 274 is provided between the gear elements 252 and the clutch element 268, and a similar chamber 276 is provided between the bear element 254 and the clutch element 270, the chambers being so constructed that when fluid under pressure is admitted to either chamber the respective clutch will be engaged to provide a drive at the indicated gear ratio between the shaft 250 and the sleeve 28. The hydraulic coupling, generally indicated at 278, has a freely rotatable portion 280 rigidly secured to the gear element 254 and a portion 282 splined to the shaft 250. The shaft 250 is provided with an internal fluid passage in the form of a tube 284 connected with the interior of the hydraulic coupling 278 and with the conduit 160 leading from the control valve, with a second internal passage 286 connected with the chamber 276 and with the conduit 130, and with an external passage 288 disposed between a reduced end portion of the shaft and a bushing 290 and connected with the chamber 274 and the conduit 94. With this arrangement it is apparent that fluid under pressure from the control valve may be separately supplied to each of the clutch operating chambers 274 and 276 and to the hydraulic synchronizing coupling 278.

The operation of the mechanism shown in Fig. 5 under the actuation of the control valve is the same as that described above except that the coupling 278 drives the same gear 258 which is driven by the high speed drive gear 254 thus providing no compensation for slip of the hydraulic coupling. Thus, it is obvious that, while the coupling will be capable of bringing the speed of the drive sleeve 28 up to or above the speed at which it is driven by the low speed drive including the gears 252 and 256, it may not be able to bring the speed of the drive sleeve quite up to the speed at which the sleeve would be driven by the high speed drive gear 254. However, since the slip of a coupling of the type illustrated is relatively negligible being in the neighborhood of three to five percent, it is apparent that this speed difference will impose no excessive strain on the clutch including the element 270 and clutch facing 266 when the drive is shifted to the high speed gear ratio.

While two slightly different mechanical embodiments have been hereinabove described and illustrated in the accompanying drawings for the purpose of disclosing the invention, it is to be understood that the invention is not limited to the particular constructions so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In combination, a change speed transmission having different ratio gear trains and fluid operated clutches for rendering said gear trains operative or inoperative, a source of hydraulic fluid under pressure, and a control valve hydraulically connected between said fluid source and said transmission operative to control the supply of fluid to said clutches individually to render said gear trains operative seriatim and impose a time interval between the end of the operative phase of one gear train and the beginning of the operative phase of the next gear train in the gear ratio series, said valve comprising a movable element operative to connect said clutches in sequence with said source of hydraulic fluid under pressure, resilient means actuatable to move said movable member in at least one direction, and hydraulic means controlling the rate of movement of said movable member by said resilient means.

2. In a change speed gear drive having a driving member and a driven member, and a plurality of gear drives of different ratios between said members, a clutch associated with each gear drive to render the respective gear drive operative or inoperative, at least one hydraulic coupling between said driving and driven members operative to accelerate said driven member from a lower to a higher speed, and a selector valve associated with said clutches and said coupling to render said clutches and said coupling operative in an order such that the driving connection may be made through the hydraulic coupling before each clutch is engaged in a speed increasing direction, said selector valve including a restricted orifice for timing the operation thereof.

3. In combination, a change speed gear drive having a driving member and a driven member, and a plurality of gear drives of different ratios between said members, a clutch associated with each gear drive to render the respective gear drive operative or inoperative, at least one hydraulic coupling between said driving and driven members operative to accelerate said driven member from a lower to a higher speed, and a selector valve associated with said clutches to render said clutches operative in an order such that the driving connection may be made through the hydraulic coupling before each clutch is engaged in a speed increasing direction, said selector valve including, a movable porting member, manually actuatable means for moving said member, a fluid flow orifice for timing the movements of said member, and a spring resiliently urging said member in one direction.

4. In a change speed gear drive having a driving member and a driven member, and a plurality of gear drives of different ratios between said members, a clutch associated with each gear drive to render the respective gear drive operative or inoperative, at least one hydraulic coupling between said driving and driven members operative to accelerate said driven member from a lower to a higher speed, and a selector valve associated with said clutches to render said clutches inoperative or to render said clutches operative in an order such that the driving connection may be made through the hydraulic coupling before each clutch is engaged in a speed increasing direction, said selector valve including a restricted orifice for timing the operation thereof.

5. In combination, a change speed drive including, a driving member, a driven member, a plurality of gear trains of different ratio between said driving member and said driven member, an hydraulically actuated clutch in each gear train to render the respective gear train operative or inoperative, and at least one hydraulic drive between said driving member and said driven member for relieving said clutches of the loads incident to synchronizing said driving and driven members when any one of said gear trains is rendered operative, and a selector valve including, manually actuatable means for selecting the drive between said driving and driven members, and automatically actuated means for rendering said hydraulic drive operative for a predetermined interval before any one of said clutches is engaged.

6. In combination, a change speed transmission having different ratio gear trains and fluid operated clutches for rendering said gear trains operative or inoperative, a source of hydraulic fluid under pressure, and a selector valve for hydraulically controlling said change speed gear comprising, a casing provided with spaced valve ports, a pressure fluid connection and a drain connection, a plunger movable in said casing and operative in different operative positions to connect one of said ports with said pressure fluid connection and another of said ports with said drain connection, manually actuatable means for moving said plunger, a spring resiliently urging said plunger in one direction, fluid pressure opposing the action of said spring, and a restricted orifice for timing the movements of said plunger by controlling the flow of said fluid.

7. In combination, a change speed drive including, a driving member, a driven member, a gear train between said driving member and said driven member, an hydraulically actuated friction clutch in said gear train to render said gear train operative or inoperative, and a hydraulic drive between said driving member and said driven member for relieving said friction clutch of the load incident to initially accelerating said driven member when said gear train is to be rendered operative, and a manually actuated control valve for establishing the drives between said driving and driven members, and automatically actuated means controlling the movements of said valve for rendering said hydraulic drive operative for a predetermined interval before said friction clutch is engaged.

8. In combination with a driving member, a driven member, and a gear drive between said members, a fluid operated clutch associated with said gear drive to render said gear drive operative or inoperative, a hydraulic coupling between said members operative to bring the speed of said driven member up to substantially the speed at which said driven member is driven by said gear drive, and means for supplying fluid to said hydraulic coupling and said clutch, and control means including a valve having a single manual position for connecting said fluid supply means with said clutch and said fluid coupling, operative to automatically connect said fluid supply means with said coupling and said clutch seriatum.

9. A change speed transmission, including a driving element, a driven element, a plurality of gear drives of different speed ratios between said driving element and said driven element, a clutch associated with each gear drive to render the respective gear drives operative or inoperative, a hydraulic coupling between said driving and driven elements in parallel with said gear drives operative to accelerate the speed of said driven element before the low speed gear drive is rendered operative or when the drive is being changed from a lower to a higher speed ratio gear drive to relieve said friction clutches of the duty of acclerating said driven element, and control means for said coupling and at least one of said clutches effective to render said coupling and said one clutch operative in sequence and to terminate the operative period of said coupling when said clutch is rendered operative.

10. In a supercharger drive including a drive shaft, a lay shaft driven by said drive shaft, and an impeller shaft, a gear fixed on said impeller shaft, a gear carried by said lay shaft rotatable relative thereto and meshing with said impeller shaft gear, a fluid actuated friction clutch for drivingly connecting said lay shaft gear to said lay shaft, a fluid coupling for drivingly connecting said lay shaft gear to said lay shaft, and means for supplying fluid under pressure to said clutch and said coupling so arranged that the fluid is supplied first to said fluid coupling and after a time interval, during which said fluid coupling has been operative, to said friction clutch.

11. In an engine supercharger having an engine driven high speed impeller, means including a change speed gear for increasing the ratio of impeller speed to engine speed to maintain the engine power substantially constant at increasing altitude, means including at least one hydraulically actuated friction clutch for operatively connecting the engine to the impeller, a fluid coupling for changing the speed of the impeller relative to the engine without discontinuing power operation of the engine, and means associated with said clutch and coupling, including a valve having a single manual position for connecting said fluid supply means with said clutch and said coupling, for directing said fluid first to said coupling and then automatically to said clutch to actuate said coupling and said clutch in sequence such that the short duration high value impeller accelerating power is transmitted through fluid friction only and the power for driving the impeller at a constant ratio to engine speed is transmitted through mechanical friction.

HARRY W. GUNBERG.